Patented Sept. 22, 1936

2,054,854

UNITED STATES PATENT OFFICE 2,054,854

MANUFACTURE OF CELLULOSE

Henry Dreyfus, London, England

No Drawing. Application August 22, 1934, Serial No. 740,966. In Great Britain September 23, 1933

8 Claims. (Cl. 92—13)

This invention relates to the production from wood or like materials of cellulose suitable for use in the manufacture of organic derivatives of cellulose.

It is known that, in general, cellulose obtained in the form of chemical wood pulps, for example, pulps produced by the sulphite, sulphate or soda processes, is not suitable for conversion into organic derivatives of cellulose, such as cellulose acetate or other cellulose esters or cellulose ethers.

According to the invention I have found that cellulose which may be satisfactorily employed as a starting material in the manufacture of cellulose esters or ethers may be obtained by subjecting wood pulp, especially sulphite, sulphate, soda or a chlorination pulp, to successive treatments, firstly with hot dilute alkali, and then with cold, more concentrated alkali. An important effect of this treatment is the removal of substances such as lignins and pentosans which exert a deleterious effect on the esterification or other reactions or tend to contaminate the products of such reactions. The two treatments are hereinafter in the specification and claims referred to as a dilute alkali treatment and a concentrated alkali treatment respectively.

The first stage in the treatment, i. e. the dilute alkali treatment, may conveniently be effected by boiling the pulp with a dilute aqueous solution of a caustic alkali, such as sodium hydroxide, although solutions of other alkaline substances may be used. Conveniently, solutions of less than about 3% concentration may be used, while especially when a strongly basic reagent such as caustic alkali is being employed, the treatment may be carried out with solutions of greater dilution, for example solutions of concentration between about ½% and 1½% or less. If desired, the treatment may be effected under pressure, whether or not a correspondingly higher temperature is employed. Thus, for example, pressures between about 6 and 10 atmospheres and, if desired, the corresponding temperatures between about 160° and 180° C., or, especially when treating poor quality pulps, even temperatures up to 200° C. and the corresponding or higher pressures may be used. Usually, however, pressures between these values and atmospheric pressure, with, if desired, the corresponding temperatures, may be employed. Pressures higher than that generated by the reagents at any particular temperature may be produced by pumping in inert gases such as nitrogen, by the addition of relatively small quantities of volatile organic liquids such as alcohol or ether, or in any other way.

The second stage of the process consists in a treatment of the material with a more concentrated alkali in the cold, i. e. at temperatures below about 35° C. and preferably between about 10° and 25° C. For example, the material may be treated with caustic alkali solution of concentration between about 10% and 20%, and especially between about 12% and 15%, at atmospheric or similar temperatures. The use of elevated temperatures during the concentrated alkali treatment should be avoided, but pressures above atmospheric may be employed if it is so desired.

The treatments with the dilute alkali and the more concentrated alkali respectively may be continued for a period of time sufficient for the removal of the greater part or substantially the whole of the lignins or pentosans remaining in the pulp; preferably, however, the treatment is discontinued before effecting substantial mercerization of the cellulose. In general, when treating chemical pulps of average composition the treatment with the hot dilute alkali may be continued for a period of about 1–4 hours or more, while the treatment with the concentrated alkali at ordinary temperatures may be continued for a similar period or for a longer period, for example up to 6 or 8 hours, although shorter times of treatment may be employed in either stage or both stages. Pulps containing exceptional quantities of lignin, pentosans or other impurities may receive a somewhat longer treatment than average pulps.

The dilute alkali liquor may with advantage be employed in amount between about 20 and 40 times, and the concentrated liquor in amount between about 8 or 10 and 20 times the weight of the pulp to be treated, but the invention is in no way limited in respect of the amount of liquor employed. When treating pulps containing exceptional quantities of lignins, pentosans or other impurities, larger quantities of alkali liquor may be used.

The treatments with the alkali may be carried out in a continuous or discontinuous manner. Conveniently, they may be effected as batch processes following directly or indirectly after the pulping process, and either open or (as is necessary when pressure is to be employed) closed vessels may be used. If desired, fresh liquor may be admitted during either stage of the process, while old or spent liquor may be drawn off; if desired, the liquors may be caused to circulate continuously over or through the material, for example in apparatus such as that described in U. S. application S. No. 727,607 filed 26th May, 1934. Moreover, the treatments with alkali may be preceded or followed by or may alternate with treatments with other purifying agents or with water or steam. Similarly either the dilute alkali or the concentrated alkali treatment or both may be conducted in stages, and these stages may, if desired, be preceded or followed by or may alternate with treatments with other agents.

After the treatment with the alkali, and if desired after the partial or complete removal of the alkali, for example by a water-wash, the cellulose may be subjected to treatment with an acid, especially an organic acid such as a lower aliphatic acid, for example formic acid or acetic acid, and such treatment is advisable when the cellulose is to be employed for the manufacture of cellulose acetate or other cellulose esters. Before the manufacture of cellulose ethers, however, it is not necessary. Conveniently, the cellulose may be treated with glacial acetic acid, for example, in amount 2 or 4 times the weight of the original pulp, and this treatment may be effected at elevated temperatures, for example temperatures between about 50° and 100° C. If desired, however, this treatment may be effected by means of the vapours of the acids; for example acetic acid vapours may be carried by a stream of air or other suitable gas or vapour in contact with the material, for instance as described in U. S. Patent No. 1,831,101. The organic acids may also be employed in association with other substances, and especially with mineral acids such as sulphuric acid, preferably in amount less than would be required for a subsequent esterification treatment, for example as described in U. S. application S. No. 726,953 filed 22nd May, 1934. If desired the mineral acid and optionally also the organic acid may be neutralized, for instance with ammonia or an organic base or a salt of a weak acid such as sodium acetate, before the cellulose is subjected to further treatment.

When the wood pulp is in an especially fine form, and presents a very large surface to the action of the alkali solution, the first stage of the treatment, i. e. the treatment with dilute alkali at elevated temperatures, may, if desired, be omitted.

As already indicated the process of the invention is especially useful when applied to chemical pulps, but it may also be used in connection with the so-called mechanical pulps, where the wood is subjected to a grinding operation in the presence of water at a more or less elevated temperature. Pulps of this kind require in general a more intense treatment than do chemical pulps. Thus they may be treated with more concentrated alkali solutions, with greater quantities of the solutions, under more rigorous conditions and/or for longer periods of time.

The cellulose obtained by the process of the invention may be employed in any desired manner, but, as already stated, it is especially suitable for use as a starting material in the manufacture of esters and ethers and other organic derivatives of cellulose. However, it may also be converted into viscose or other cellulose solutions which may be used for the manufacture of artificial filaments, films or the like. When it is employed for the manufacture of viscose subsequent treatment with acid is unnecessary. Again, it may be employed for the manufacture of paper or other products comprising fibrous cellulose, especially when it is desired to produce products of a very high degree of purity. The cellulose may also, if desired, be subjected to other treatments for the removal of impurities; for instance it may be subjected to a chlorine bleach or the like.

The following examples illustrate without in any way limiting the invention:—

Example 1

Pulp obtained by treating spruce wood by the sulphite process is heated with 30 times its weight of a 1% solution of sodium hydroxide to a temperature of 110° C. under a pressure of 5 atmospheres produced by compressed nitrogen. After about 3 hours the liquor is drained off and replaced by ten times the weight of the pulp of a 12% sodium hydroxide solution at normal temperature. The materials are occasionally stirred, and after 6 or 8 hours the alkali is drained off, and the cellulose is washed thoroughly with water and then heated with 3 times its weight of glacial acetic acid to a temperature of 60° C. for 5 hours. The product is suitable for conversion into cellulose acetate.

Example 2

A pulp obtained from poplar by the sulphate process is boiled under atmospheric pressure with 35 times its weight of a ¾% sodium hydroxide solution for about 3 hours. The dilute alkali is then replaced by about one quarter of its weight of cold 15% sodium hydroxide solution, and the materials allowed to stand with occasional stirring for 8 hours. The cellulose, after removal of the alkali and washing, may be subjected to an acid treatment as above described and employed in the manufacture of cellulose acetate, or it may be employed directly for the manufacture of cellulose ethers.

Example 3

A spruce sulphite pulp is finely comminuted in an edge runner mill and is treated in the cold with 15 times its weight of 16% sodium hydroxide solution for 8 hours. The cellulose obtained may be subjected to an acid treatment as described above, and may then be subjected to acetylation.

What I claim and desire to secure by Letters Patent is:—

1. Process for the manufacture of cellulose, which comprises subjecting a chemical wood pulp to a treatment with an alkali solution of concentration between ½ and 3% at a temperature of at least 100° C., followed by a treatment with a caustic alkali solution of concentration between 10 and 20% at a temperature below 35° C.

2. Process for the manufacture of cellulose, which comprises subjecting a chemical wood pulp to a treatment with an alkali solution of concentration between ½ and 3% at a temperature of at least 100° C., followed by a treatment with a caustic alkali solution of concentration between 12 and 15% at a temperature between 10° and 20° C.

3. Process for the manufacture of cellulose, which comprises subjecting a chemical wood pulp to a treatment with a caustic alkali solution of concentration between ½ and 1½% at a temperature between 100° and 180° C., followed by a treatment with a caustic alkali solution of concentration between 12 and 15% at a temperature between 10° and 20° C.

4. Process for the manufacture of cellulose, which comprises subjecting a chemical wood pulp to a treatment with an alkali solution of concentration between ½ and 3% at a temperature of at least 100° C. and under pressure greater than the vapor pressure of the solution at the temperature employed, followed by a treatment with a caustic alkali solution of concentration between 10 and 20% at a temperature below 35° C.

5. Process for the manufacture of cellulose, which comprises subjecting a chemical wood pulp to a treatment with an alkali solution of concentration between ½ and 3% at a temperature of at least 100° C., followed by a treatment with a caustic alkali solution of concentration between 10 and 20% at a temperature below 35° C. for a period insufficient to effect substantial mercerization of the cellulose.

6. Process for the manufacture of cellulose, which comprises subjecting a chemical wood pulp to a treatment with an alkali solution of concentration between ½ and 3% at a temperature of at least 100° C. and under pressure greater than the vapor pressure of the solution at the temperature employed, followed by a treatment with a caustic alkali solution of concentration between 10 and 20% at a temperature below 35° C. for a period insufficient to effect substantial mercerization of the cellulose.

7. Process for the manufacture of cellulose, which comprises subjecting a chemical wood pulp to a treatment with an alkali solution of concentration between ½ and 3% at a temperature of at least 100° C., followed by a treatment with a caustic alkali solution of concentration between 10 and 20% at a temperature below 35° C., and subjecting the product to a treatment with an organic acid.

8. Process for the manufacture of cellulose, which comprises subjecting a chemical wood pulp to a treatment with an alkali solution of concentration between ½ and 3% at a temperature of at least 100° C. and under pressure greater than the vapor pressure of the solution at the temperature employed, followed by a treatment with a caustic alkali solution of concentration between 10 and 20% at a temperature below 35° C. for a period insufficient to effect substantial mercerization of the cellulose, and subjecting the product to a treatment with a lower fatty acid.

HENRY DREYFUS.